United States Patent
Sheik et al.

(10) Patent No.: US 9,451,618 B2
(45) Date of Patent: Sep. 20, 2016

(54) DEVICES AND METHODS FOR FACILITATING H-RNTI UPDATES IN NETWORK-INITIATED CELL REDIRECTION

(71) Applicant: QUALCOMM Incorporated, San Diego, CA (US)

(72) Inventors: Ansah Ahmed Sheik, Hyderabad (IN); Dinesh Billa, Hyderabad (IN); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/083,292

(22) Filed: Nov. 18, 2013

(65) Prior Publication Data

US 2014/0254506 A1    Sep. 11, 2014

Related U.S. Application Data

(60) Provisional application No. 61/775,266, filed on Mar. 8, 2013.

(51) Int. Cl.
*H04W 72/04* (2009.01)
*H04W 48/08* (2009.01)
*H04W 48/20* (2009.01)

(52) U.S. Cl.
CPC ........... *H04W 72/048* (2013.01); *H04W 48/20* (2013.01); *H04W 48/08* (2013.01)

(58) Field of Classification Search
CPC .... H04L 1/1621; H04L 1/1812; H04W 8/26; H04W 36/10; H04W 48/08; H04W 48/20; H04W 68/00; H04W 72/048; H04W 72/06; H04W 76/027
See application file for complete search history.

(56) References Cited

U.S. PATENT DOCUMENTS

| 8,130,724 B2 | 3/2012 | Digirolamo et al. |
| 2007/0258402 A1* | 11/2007 | Nakamata et al. ........... 370/329 |

(Continued)

FOREIGN PATENT DOCUMENTS

EP    2568747 A1    3/2013

OTHER PUBLICATIONS

Huawei, et al., "Discussion on H-RNTI Handling in cell Update procedure," 3GPP draft; R2-115849 Discussion on on H-RNTI Handling in cell update Procedure 3rd Generation Partnership Project (3GPP), Mobile Competence Centre; 650, Route Des Lucioles; F-06921 Sophia-Antipolis Cedex; France, vol. RAN WG2, no. San Francisco, USA; 20111114-20111118, Nov. 8, 2011, 7 pages, XP050564333, [retrieved on Nov. 8, 2011], p. 1, paragraph 1-p. 2, paragraph 2.1.

(Continued)

*Primary Examiner* — Michael Thier
*Assistant Examiner* — Prince A Mensah
(74) *Attorney, Agent, or Firm* — Loza & Loza LLP (57) ABSTRACT

Access terminals are adapted to facilitate updating an access terminal with a valid H-RNTI in response to a network-initiated redirection of an access terminal from a serving cell to a target cell in a wireless communications system. According to at least one example, an access terminal can acquire a target cell in response to a network-initiated redirection indicated by a received redirection message. A determination can be made that a current radio network temporary identity (RNTI) associated with the access terminal is invalid for use in the target cell. In response to the determination that the RNTI is invalid for use in the target cell, a cell update procedure may be initiated to obtain a valid RNTI for use in the target cell. Other aspects, embodiments, and features are also included.

19 Claims, 7 Drawing Sheets

(56) References Cited

U.S. PATENT DOCUMENTS

| | | |
|---|---|---|
| 2008/0089285 A1* | 4/2008 | Pirskanen et al. ............ 370/329 |
| 2008/0188220 A1* | 8/2008 | DiGirolamo ......... H04W 36/10 |
| | | 455/434 |
| 2008/0232313 A1* | 9/2008 | Kuo .............................. 370/329 |
| 2009/0168728 A1 | 7/2009 | Pani et al. |
| 2009/0323624 A1 | 12/2009 | Kim |
| 2010/0093341 A1 | 4/2010 | Yu |
| 2010/0189071 A1* | 7/2010 | Kitazoe ........................ 370/331 |
| 2012/0108242 A1 | 5/2012 | Farnsworth et al. |

OTHER PUBLICATIONS

International Search Report and Written Opinion—PCT/US2014/015842—ISA/EPO—Jul. 2, 2014.

Nokia: "Analysis of HSDPA in cell FACH State," 3rd Generation Partnership Project (3GPP); Technical Specification Group (TSG) Radio Access Network (RAN); Working Group 1 (WG1), XX, XX, vol. R1-062884, Oct. 9, 2006, pp. 1-5, XP002472446, p. 9-p. 10.

* cited by examiner

DEVICES AND METHODS FOR FACILITATING H-RNTI UPDATES IN NETWORK-INITIATED CELL REDIRECTION

CLAIM OF PRIORITY UNDER 35 U.S.C. §119

The present Application for Patent claims priority to Provisional Application No. 61/775,266 entitled "Maintaining Synchronization With Network Upon Redirection to a Cell in FACH State Without H-RNTI" filed Mar. 8, 2013, and assigned to the assignee hereof and hereby expressly incorporated by reference herein.

TECHNICAL FIELD

The technology discussed below relates generally to wireless communications, and more specifically to methods and devices for facilitating updating an access terminal with a valid H-RNTI when there is a network-initiated cell redirection.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate updating an access terminal with a valid H-RNTI in response to a network-initiated redirection of an access terminal from a serving cell to a target cell in a wireless communications system.

According to at least one aspect of the disclosure, access terminals may include a communications interface and a storage medium, each coupled with a processing circuit. The processing circuit may be adapted to receive a redirection message via the communications interface. The redirection message may be adapted to instruct the access terminal to redirect to a target cell. The processing circuit may further be adapted to acquire the target cell in response to the redirection message, and determine that a current radio network temporary identity (RNTI) associated with the access terminal is invalid for use in the target cell. In response to the determination that the RNTI is invalid for use in the target cell, the processing circuit may be adapted to initiate a cell update procedure in the target cell.

Further aspects provide methods operational on access terminals and/or access terminals including means to perform such methods. One or more examples of such methods may include receiving a redirection message from a serving cell in a wireless network. A target cell in the wireless network may be acquired in response to the redirection message. A determination may be made whether a current radio network temporary identity (RNTI) associated with the access terminal is valid for use in the target cell. If the RNTI is determined to be invalid for use in the target cell, a cell update procedure may be initiated in the target cell.

Still further aspects include processor-readable storage mediums comprising programming operational on a computer, such as an access terminal According to one or more examples, such programming may be adapted for causing a processing circuit to acquire a target cell in response to a received redirection message. The programming may further be adapted to cause a processing circuit to determine whether a current radio network temporary identity (RNTI) is invalid for use in the target cell. Additionally, the programming may be adapted to cause a processing circuit to initiate a cell update procedure in the target cell in response to the determination that the RNTI is invalid for use in the target cell.

Other aspects, features, and embodiments associated with the present disclosure will become apparent to those of ordinary skill in the art upon reviewing the following description in conjunction with the accompanying figures.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for UMTS and 3rd Generation Partnership Project (3GPP) protocols and systems, and related terminology may be found in much of the following description. However, those of ordinary skill in the art will recognize that one or more aspects of the present disclosure may be employed and included in one or more other wireless communication protocols and systems.

Figure 1:
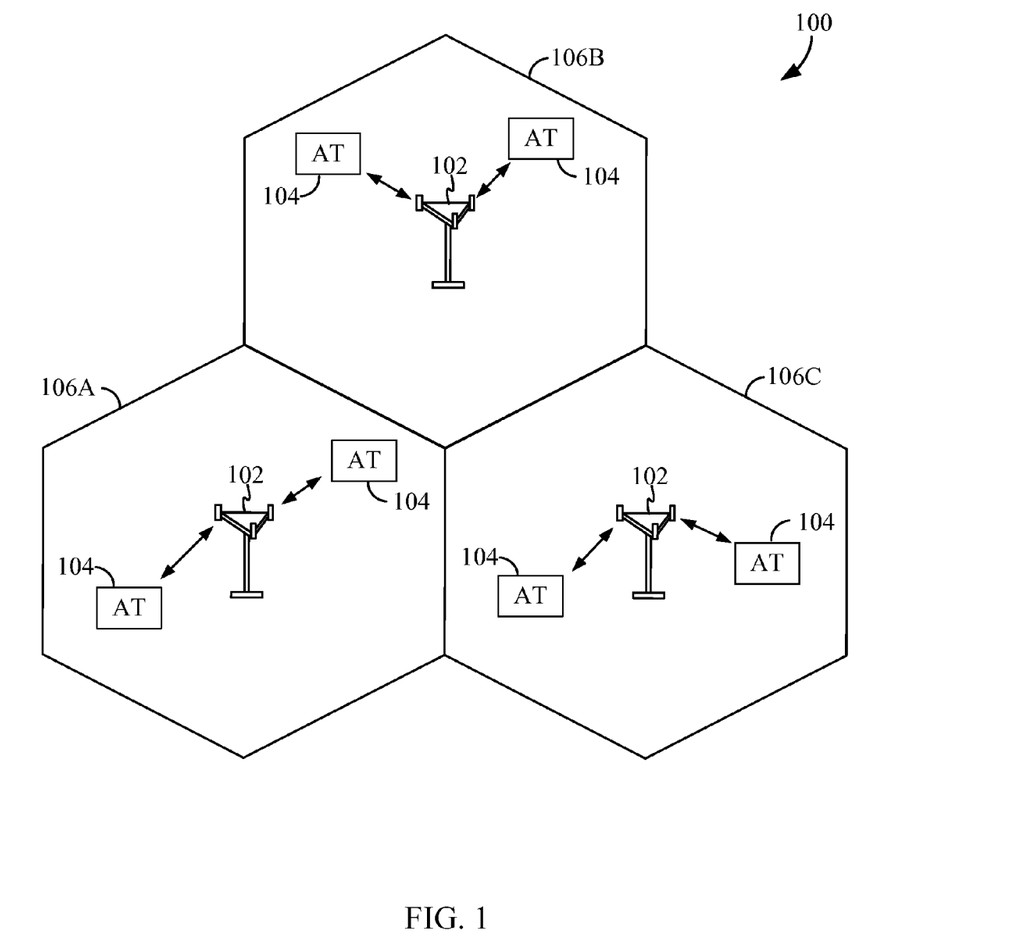
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
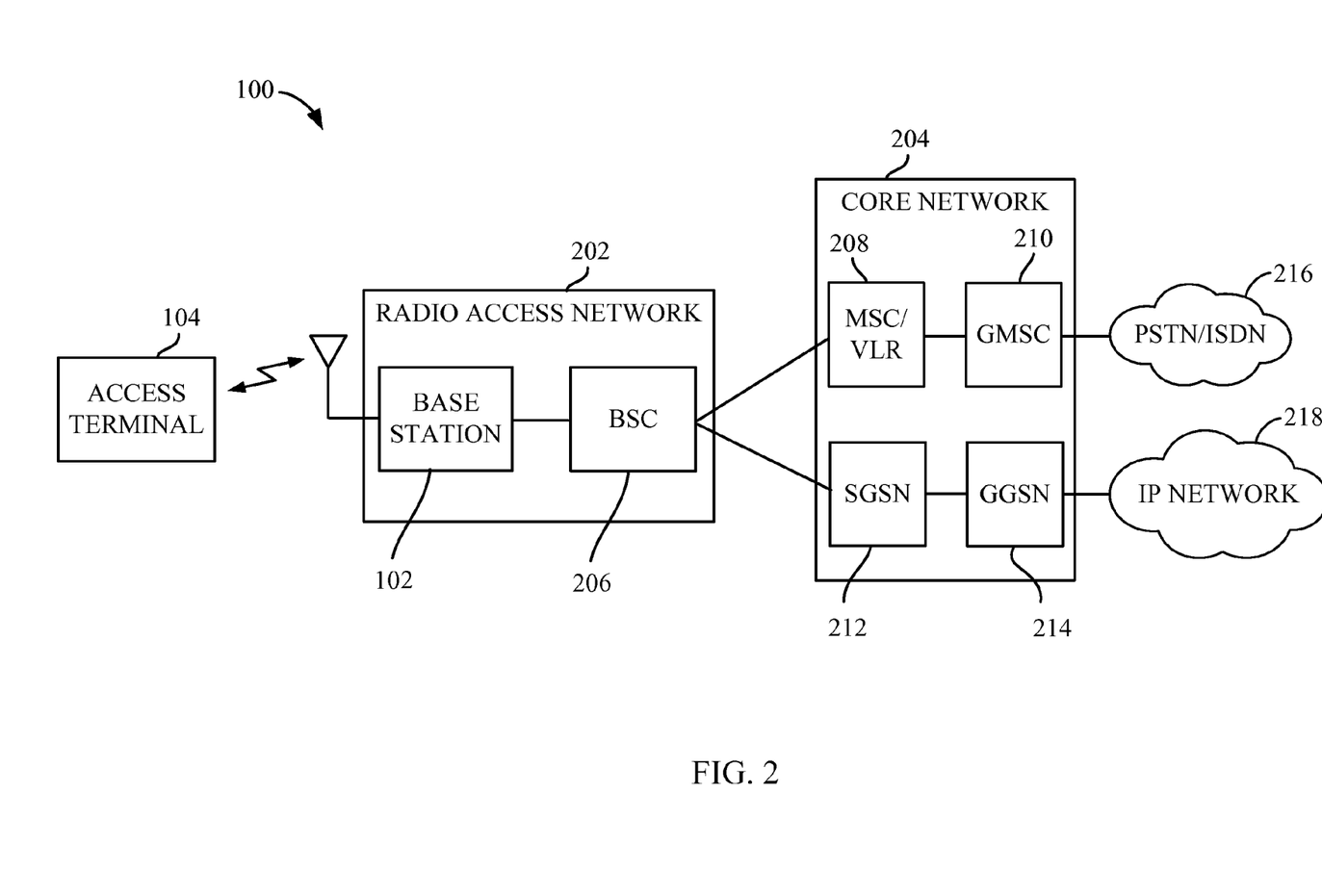
FIG. 2 is a block diagram illustrating select components of the wireless communication system of FIG. 1 according to at least one example.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106A, 106B, or 106C. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, router, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
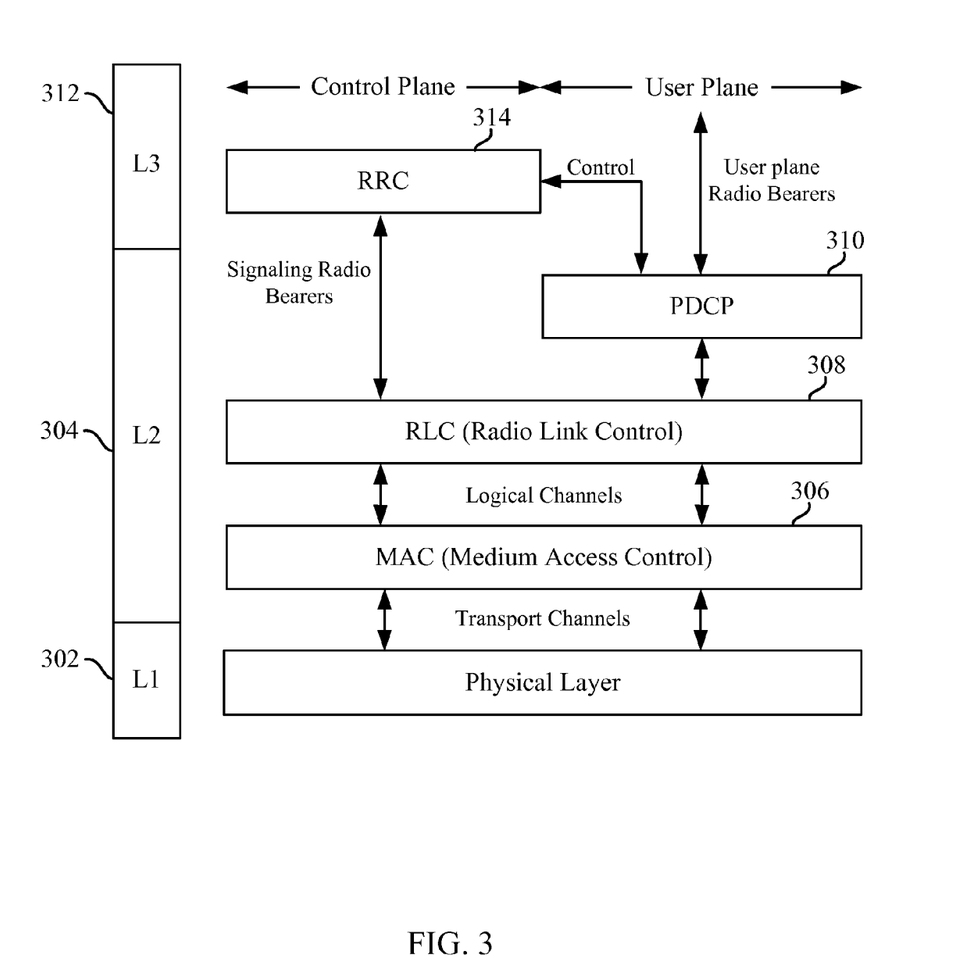
FIG. 3 is a block diagram illustrating an example of a protocol stack architecture which may be implemented by an access terminal

The access terminal 104 may be adapted to employ a protocol stack architecture for communicating data between the access terminal 104 and one or more network nodes of the wireless communication system 100. A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 3 is a block diagram illustrating an example of a protocol stack architecture which may be implemented by an access terminal 104. In the example of a signaling protocol stack in FIG. 3, the protocol stack is divided into a Non-Access Stratum (NAS) and an Access Stratum (AS). The NAS provides the upper layers, for signaling between the access terminal 104 and the core network 204 (referring to FIG. 2), and may include circuit switched and packet switched protocols. The AS provides the lower layers, for signaling between the RAN 202 and the access terminal 104, and may include a user plane and a control plane. Here, the user plane or data plane carries user traffic, while the control plane carries control information (i.e., signaling).

As shown in FIG. 3, the AS includes three layers: Layer 1 (L1), Layer 2 (L2), and Layer 3 (L3). Layer 1 302 is the lowest layer and implements various physical layer signal processing functions. Layer 1 302 is also referred to herein as the physical layer 302. This physical layer 302 provides for the transmission and reception of radio signals between the access terminal 104 and a base station 102.

The data link layer, called layer 2 (or "the L2 layer") 304 is above the physical layer 302 and is responsible for delivery of signaling messages generated by Layer 3. The L2 layer 304 makes use of the services provided by the physical layer 302. The L2 layer 304 may include various sublayers. In the control plane, the L2 layer 304 includes two sublayers: a medium access control (MAC) sublayer 306 and a radio link control (RLC) sublayer 308. In the user plane, the L2 layer 304 additionally includes a packet data convergence protocol (PDCP) sublayer 310. Although not shown, the access terminal 104 may have several upper layers above the L2 layer 304 including a network layer (e.g., IP layer) that is terminated at a PDN gateway on the network side, and an application layer that is terminated at the other end of the connection.

The MAC sublayer 306 is the lower sublayer of the L2 layer 304. The MAC sublayer 306 implements the medium access protocol and is responsible for transport of higher layers' protocol data units using the services provided by the physical layer 302. The MAC sublayer 306 may manage the access of data from the higher layers to the shared air interface.

The RLC sublayer 308 is above the MAC sublayer 306 in the L2 layer 304. The RLC sublayer 308 implements a data link protocol that provides for the correct transport and delivery of signaling messages generated at the layer 3. The RLC sublayer makes use of the services provided by the lower layers (e.g., layer 1 and the MAC sublayer).

The PDCP sublayer 310 provides multiplexing between different radio bearers and logical channels. The PDCP sublayer 310 also provides header compression for upper layer data packets to reduce radio transmission overhead, security by ciphering the data packets, and handover support for access terminals 104 between base stations 102.

Layer 3 312, which may also be referred to as the upper layer or the L3 layer, originates and terminates signaling messages according to the semantics and timing of the communication protocol between a base station 102 and the access terminal 104. At the L3 layer 312, an RRC layer 314 handles the control plane signaling between the access terminal 104 and the base station 102. The RRC layer 314 includes a number of functional entities for routing higher layer messages, handling broadcasting and paging functions, establishing and configuring radio bearers, etc.

As determined by the RRC layer 314, the access terminal 104 can be in one of several RRC states. RRC states include an IDLE mode and a connected mode. The IDLE mode has the lowest energy consumption, while the connected mode includes several intermediate levels of stand-by states. The access terminal 104 can change its RRC state depending on call or connection activity, entering into lower and lower states when the access terminal 104 is inactive. The stand-by states provide for different trade-offs between factors such as network capacity, call set-up times, battery time, and data speeds. The IDLE state saves battery power but provides little wireless connectivity.

In the RRC connected mode, the access terminal 104 can employ one of several states, including a CELL-DCH state and a CELL_FACH state. The CELL_DCH state is an RRC connected mode in which dedicated uplink and downlink physical channels are allocated to the access terminal 104, and the access terminal 104 is known at a cell level according to its current active set. The access terminal 104 may monitor a downlink shared channel, such as a high-speed downlink shared channel (HS-DSCH) and a high-speed physical downlink shared channel (HS-PDSCH) for user data and signaling messages as directed by the access network. The access terminal 104 may also monitor a forward access channel (FACH) for broadcast messages.

The CELL_FACH state is an RRC connected mode in which neither uplink nor downlink dedicated physical channels are allocated to the access terminal 104. However, the access terminal 104 continuously monitors a forward access channel (FACH) in the downlink for broadcast messages or other relatively small downlink transmissions. The access terminal 104 may be assigned a default common or shared transport channel in the uplink, such as a random access channel (RACH) that may be used for interactions with the base station 102 in order to initially synchronize the device's transmission with a base station 102. For example, the RACH may be used by the access terminal 104 to access the radio access network 202 for initial access, and for certain data transmissions. Messages are transmitted in an unscheduled manner on the RACH.

In the CELL_FACH state, the access terminal 104 is known on a per-cell level, and is considered to reside in the cell on which the access terminal 104 last performed a cell update procedure. The access terminal 104 may be identified by a radio network temporary identity (RNTI), which may include a cell-RNTI (C-RNTI) assigned in the current cell for use on common transport channels.

In 3GPP Release-7 standards, a new enhanced version of CELL_FACH was introduced, which may be called HS-FACH. In HS-FACH, the access terminal 104 is enabled to receive high-speed transmissions in CELL_FACH, utilizing the high-speed downlink shared channel (HS-DSCH) established in earlier standards for high-speed downlink packet access (HSDPA). HS-FACH is supported in some cells (e.g., those configured in accordance with 3GPP Release-7 including HS-FACH) but not others. To utilize HS-FACH, an access terminal 104 generally requires a certain type of identifier associated with the HS-DSCH, called the H-RNTI.

As an access terminal 104 operates within the wireless communications system 100, the access terminal 104 may be instructed by the network to transition from one cell to a different cell. For example, the access terminal 104 may be redirected using an RRC reconfiguration procedure in which the access terminal 104 is directed to camp on a target frequency indicated in information transmitted with the RRC reconfiguration message. Typically, the access terminal 104 is redirected while in the CELL_FACH state. If the access terminal 104 is in the CELL_DCH state, for example, the network may trigger a transition of the access terminal 104 from the CELL_DCH state to the CELL_FACH state prior to redirecting the access terminal 104 to a different cell. The access terminal 104 may acquire a new cell in response to a redirection from the network, and may enter a CELL_FACH state in the new cell. In the CELL_FACH state, the access terminal 104 may attempt to monitor the new cell for downlink data. To receive downlink data, however, the access terminal 104 must have a valid RNTI.

In many instances, when the network initiates the redirection, an RNTI associated with the target cell may be included in the redirection instruction sent by the network to the access terminal 104. In other instances, however, the RNTI to be used in the target cell by the access terminal 104 in CELL_FACH is not provided in the redirection instruction. For example, the network may redirect the access terminal 104 from a first cell that may or may not support HS-FACH, to a second cell that supports HS-FACH, but the network may not provide in the redirection request a new H-RNTI (required for HS-FACH) to be used in the second cell. In conventional systems, the access terminal 104 is expected to use the H-RNTI previously configured for the first cell prior to redirection. However, if the H-RNTI configured for the first cell is invalid on the second cell, the access terminal 104 may be unable to utilize the HS-DSCH in the second cell.

A new H-RNTI can be obtained by the access terminal 104 by performing a cell update procedure. However, a cell update procedure is typically not performed when the redirection is initiated by the network, since it is assumed that the network already knows where the access terminal 104 is located.

Figure 4:
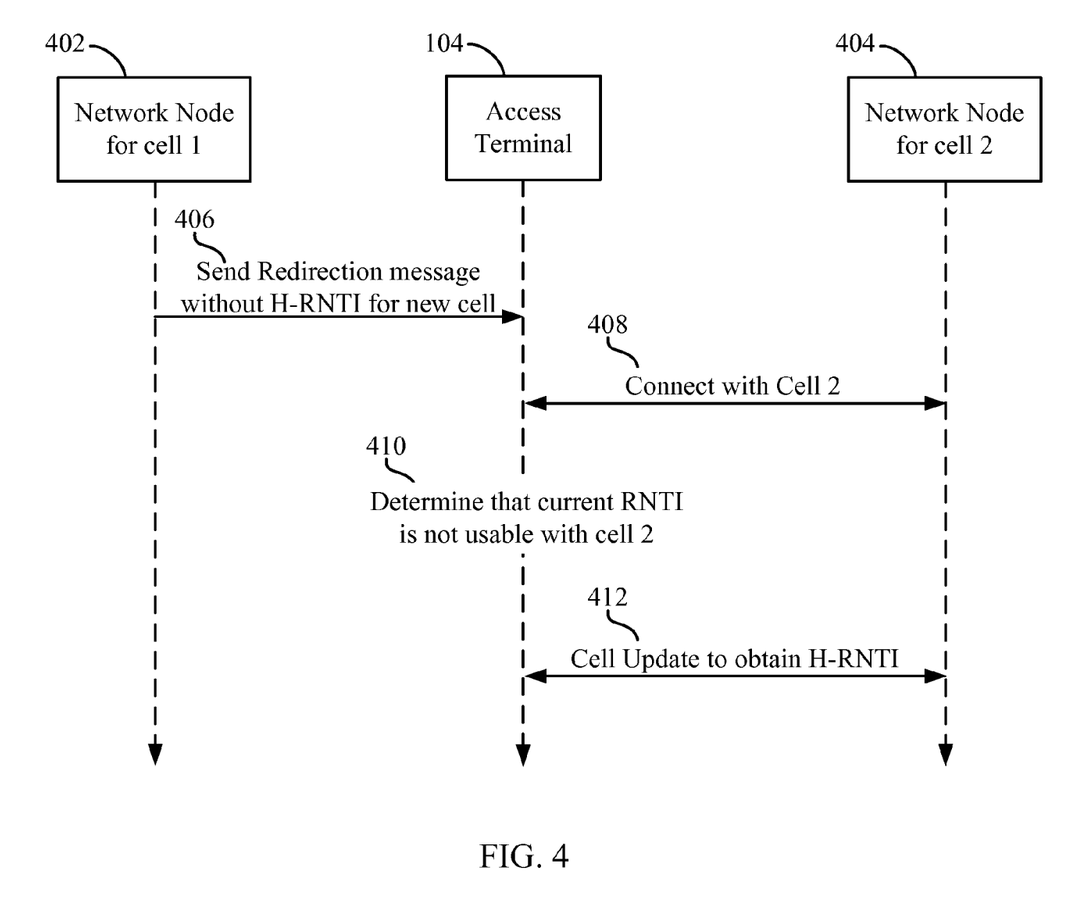
FIG. 4 is a flow diagram illustrating an example of an access terminal performing a cell update procedure to obtain an H-RNTI with a new cell.

According to at least one aspect of the present disclosure, access terminals are adapted to perform a cell update procedure in response to a network initiated redirection from one cell to another when the access terminal's previous RNTI is not usable with the new cell. FIG. 4 is a flow diagram illustrating an example of an access terminal 104 performing a cell update procedure to obtain an H-RNTI with a new cell. As shown, an access terminal 104 may receive a redirection message 406 sent from a network node 402 associated with cell 1. In this example, the redirection message 406 does not include an H-RNTI to be used with the new cell. Such a redirection message may be an RRC reconfiguration message in at least one example. The message can include instructions for the access terminal 104 to disconnect from the first cell and initiate acquisition of an indicated second cell.

In response to the redirection message, the access terminal 104 can connect 408 with one or more network nodes 404 associated with cell 2. In this example, cell 2 supports HS-FACH described above. Connecting to cell 2 may include entering into a CELL_FACH state on cell 2. The access terminal 104 can further determine 410 that its current RNTI is not usable with cell 2. For example, the access terminal 104 may not have an H-RNTI for HS-FACH, or the access terminal 104 may have an H-RNTI associated with cell 1 that is not valid for use in cell 2.

In response to determining that the current RNTI for the access terminal 104 is not usable with cell 2, the access terminal 104 performs a cell update procedure 412 with one or more network nodes 404 of cell 2.

Figure 5:
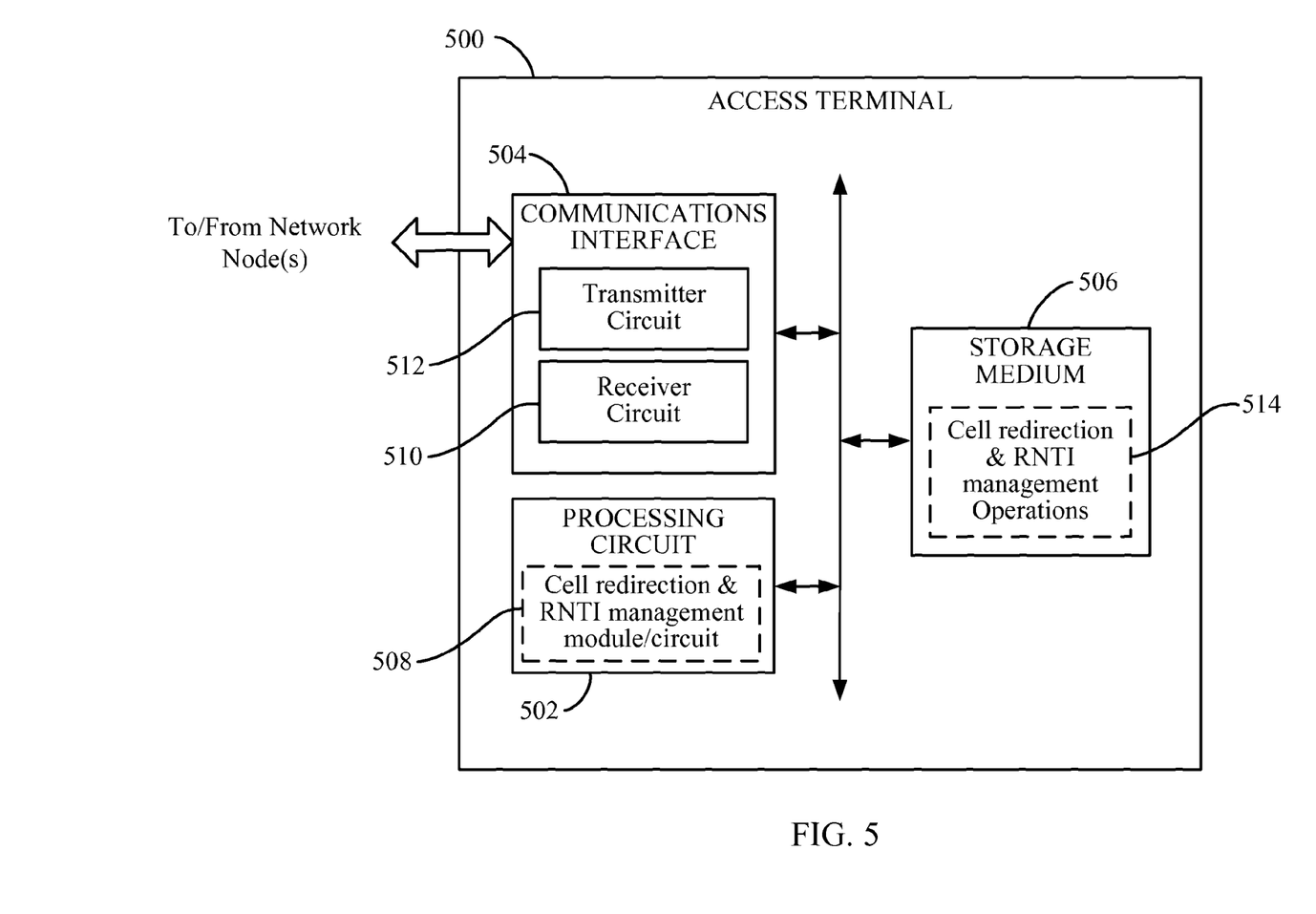
FIG. 5 is a block diagram illustrating select components of an access terminal according to at least one example.

Turning to FIG. 5, a block diagram is shown illustrating select components of an access terminal 500 according to at least one example of the present disclosure. The access terminal 500 includes a processing circuit 502 coupled to or placed in electrical communication with a communications interface 504 and a storage medium 506.

The processing circuit 502 is arranged to obtain, process and/or send data, control data access and storage, issue commands, and control other desired operations. The processing circuit 502 may include circuitry adapted to implement desired programming provided by appropriate media in at least one example. For example, the processing circuit 502 may be implemented as one or more processors, one or more controllers, and/or other structure configured to execute executable programming Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is adapted for processing, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 502 may include a cell redirection and RNTI management module/circuit 508. The cell redirection and RNTI management module/circuit 508 may include circuitry and/or programming (e.g., cell redirection and RNTI management operations stored on the storage medium 506) adapted to redirect to a target cell, determine that a current RNTI is invalid for use in the target cell, and initiate a cell update procedure in the target cell when the current RNTI is invalid for use in the target cell.

The communications interface 504 is configured to facilitate wireless communications of the access terminal 500. For example, the communications interface 504 may include circuitry and/or programming adapted to facilitate the communication of information bi-directionally with respect to one or more wireless network devices (e.g., network nodes). The communications interface 504 may be coupled to one or more antennas (not shown), and includes wireless transceiver circuitry, including at least one receiver circuit 510 (e.g., one or more receiver chains) and/or at least one transmitter circuit 512 (e.g., one or more transmitter chains).

The storage medium 506 may represent one or more processor-readable devices for storing programming, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor, including portable or fixed storage devices, optical storage devices, and various other mediums capable of storing, containing and/or carrying programming By way of example and not limitation, the storage medium 506 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the access terminal 500, external to the access terminal 500, distributed across multiple entities).

Programming stored by the storage medium 506, when executed by the processing circuit 502, causes the processing circuit 502 to perform one or more of the various functions and/or process steps described herein. For example, the storage medium 506 may include cell redirection and RNTI management operations 514 adapted to cause the processing circuit 502 to acquire a target cell in response to a redirection message, determine that a current RNTI is invalid for use in the target cell, and initiate a cell update procedure in the target cell in response to the RNTI being invalid, as described herein. Thus, according to one or more aspects of the present disclosure, the processing circuit 502 is adapted to perform (in conjunction with the storage medium 506) any or all of the processes, functions, steps and/or routines for any or all of the access terminals described herein (e.g., access terminal 104, access terminal 500). As used herein, the term "adapted" in relation to the processing circuit 502 may refer to the processing circuit 502 being one or more of configured, employed, implemented, and/or programmed (in conjunction with the storage medium 506) to perform a particular process, function, step and/or routine according to various features described herein.

Figure 6:
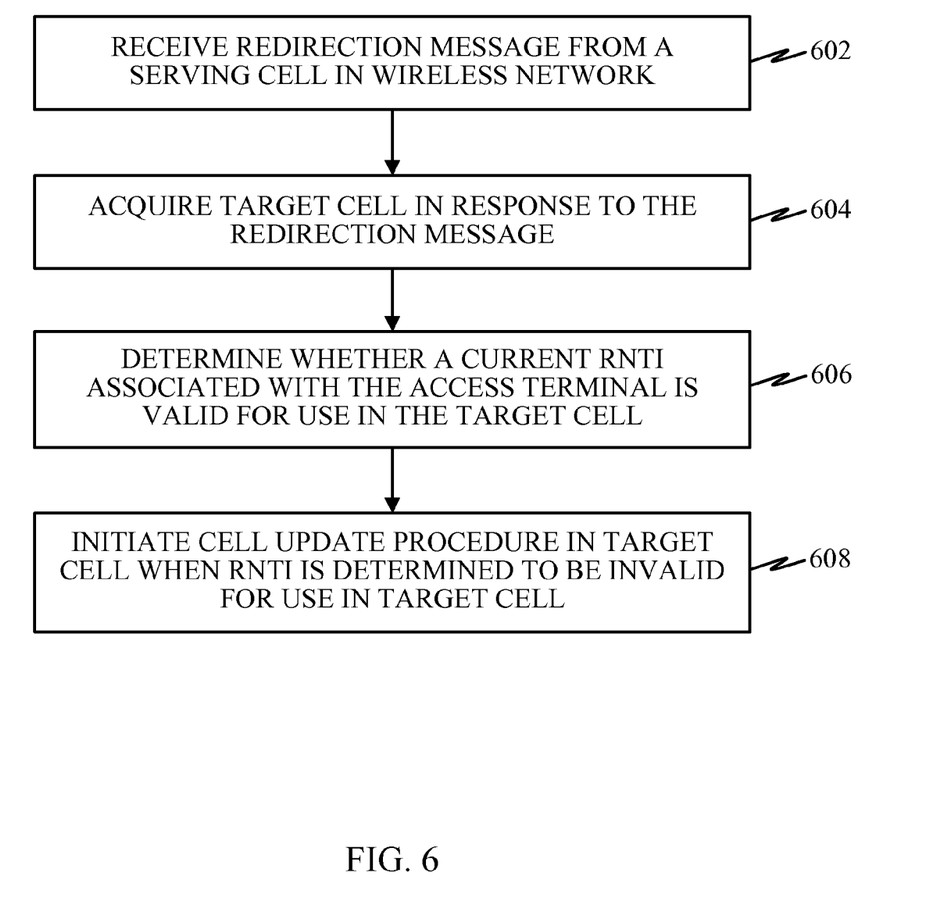
FIG. 6 is a flow diagram illustrating a method operational on an access terminal according to at least one example.

FIG. 6 is a flow diagram illustrating at least one example of a method operational on an access terminal, such as the access terminal 500. Referring to FIGS. 5 and 6, an access terminal 500 can receive a redirection message from a serving cell in the wireless network at block 602. For example, the processing circuit 502 may receive via the communications interface 504 a redirection message from a serving cell on which the access terminal 500 is camped. Such a redirection message can begin a network-directed cell redirection process at the access terminal 500.

Figure 7:
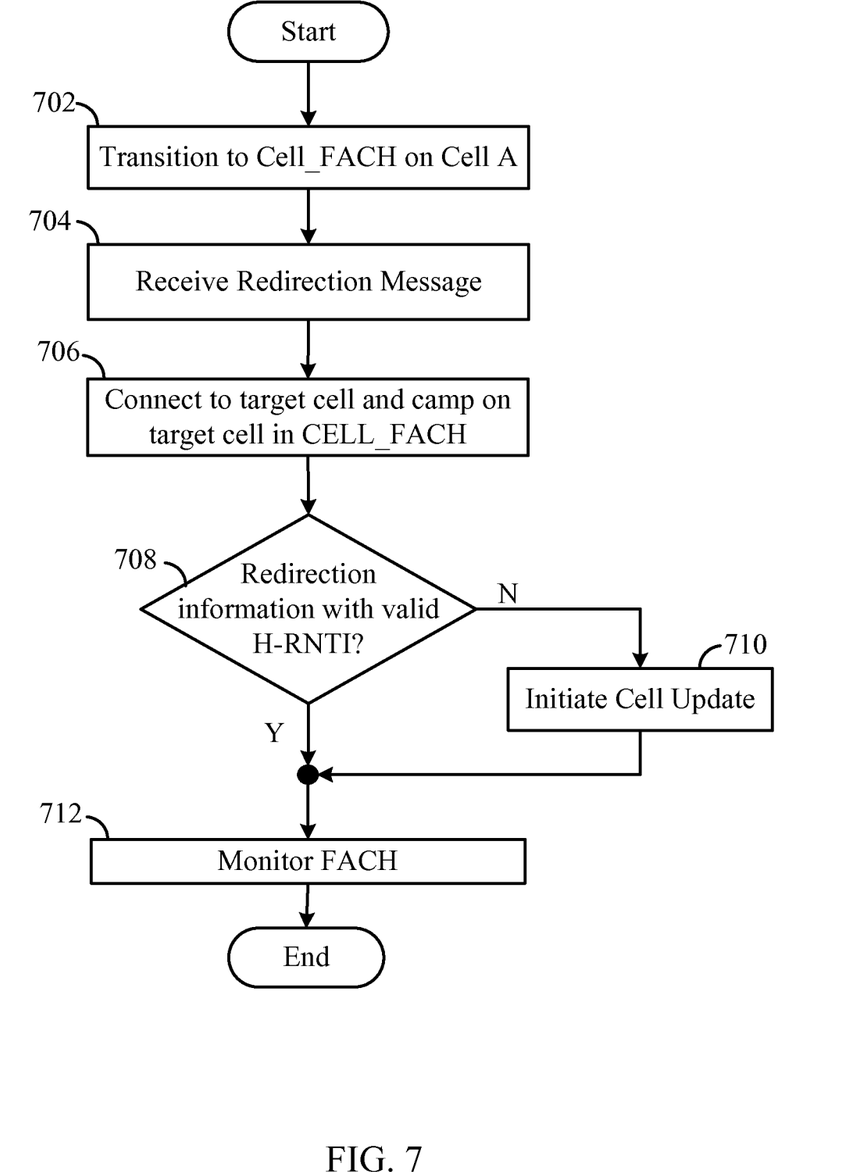
FIG. 7 is a flow diagram illustrating at least one example of a process executable by a processing circuit for performing the process of FIG. 6.

Referring to FIG. 7, a flow diagram is shown according to at least one example of a process executable by the processing circuit 502 for performing the process of FIG. 6. In this example, operations 702 and 704 may be employed to perform block 602. More specifically, the processing circuit 502 (e.g., the cell redirection & RNTI management module/circuit 508) executing the cell redirection & RNTI management operations 514 may initially transition to a CELL_FACH state in the serving cell at operation 702. In some instance, the access terminal 500 may have been in an active mode in the serving cell, such as in a CELL_DCH state, using a dedicated channel for communicating with the network. In such instances, the access terminal 500 can transition to the CELL_FACH state. In other instances, the access terminal 500 may have already been in the CELL_FACH state for an extended period of time prior to the network initiated redirection, whereby the access terminal 500 would receive messages from the wireless network on a FACH. In such examples, the access terminal 500 would have been assigned an RNTI to be used to receive the messages broadcast by the wireless network on the FACH.

At operation 704, the processing circuit 502 (e.g., the cell redirection & RNTI management module/circuit 508) executing the cell redirection & RNTI management operations 514 may obtain a redirection message, received from the serving cell via the communications interface 504. In one or more examples, the redirection message may be an RRC reconfiguration message. The redirection message is adapted to cause the processing circuit 502 (e.g., the cell redirection & RNTI management module/circuit 508) executing the cell redirection & RNTI management operations 514 to disconnect from the serving cell, and to initiate acquisition of a target cell. The redirection message may include redirection information identifying the target cell to be acquired, while failing to include a valid RNTI (e.g., a valid H-RNTI) for use by the access terminal 500 in the target cell.

Referring again to FIGS. 5 and 6, the access terminal 500 may acquire the target cell in response to the redirection message at block 604. For example, the processing circuit 502 (e.g., the cell redirection & RNTI management module/circuit 508) executing the cell redirection & RNTI management operations 514 may perform conventional acquisition of the target cell according to typical redirection procedures. More specifically, and with reference to FIG. 7, the processing circuit 502 (e.g., the cell redirection & RNTI management module/circuit 508) executing the cell redirection & RNTI management operations 514 may perform operation 706 by connecting to the target cell and camping on the target cell in CELL_FACH state. According to an aspect of the present disclosure, the target cell employs an enhanced CELL_FACH state whereby the access terminal 500 can receive messages broadcast on an HS FACH channel. As set forth above, when the target cell supports the HS-FACH feature, the access terminal 500 uses an H-RNTI for receiving messages broadcast by the wireless network on the HS_FACH.

At block 606 in FIG. 6, the access terminal may determine whether its current RNTI is valid for use in the target cell. For example, the processing circuit 502 (e.g., the cell redirection & RNTI management module/circuit 508) executing the cell redirection & RNTI management operations 514 may make a determination as to whether the current RNTI is valid for use in the target cell. In at least one example, the processing circuit 502 (e.g., the cell redirection & RNTI management module/circuit 508) executing the cell redirection & RNTI management operations 514 may make such a determination by determining that the target cell employs the HS-FACH feature, and that the current RNTI (e.g., the RNTI stored in the storage medium 506 that was valid for the serving cell) is not an H-RNTI. In another example, the processing circuit 502 (e.g., the cell redirection & RNTI management module/circuit 508) executing the cell redirection & RNTI management operations 514 may determine that the current RNTI is an H-RNTI that was valid in the serving cell, and that the current H-RNTI is not valid in the target cell.

In the example algorithm of FIG. 7, block 606 of FIG. 6 may be carried out at decision diamond 708, whereby the processing circuit 502 (e.g., the cell redirection & RNTI management module/circuit 508) executing the cell redirection & RNTI management operations 514 determines whether the redirection message includes redirection information with a valid H-RNTI for the target cell.

Referring again to FIG. 6, the access terminal 500 can initiate a cell update procedure in the target cell when the RNTI is determined to be invalid for use in the target cell, at block 608. In this example, the cell update is performed, even though the network is already aware of the access terminal 500 and its location, since the redirection was initiated by the network. In one example, the processing circuit 502 (e.g., the cell redirection & RNTI management module/circuit 508) executing the cell redirection & RNTI management operations 514 can perform the cell update procedure to update the radio access network with the current cell of the access terminal 500 after the cell redirection. Block 608 may correspond to operation 710 in the algorithm of FIG. 7. For example, if the redirection information does not include a valid H-RNTI at decision diamond 708, then the processing circuit 502 (e.g., the cell redirection & RNTI management module/circuit 508) executing the cell redirection & RNTI management operations 514 goes to operation 710, whereby a cell update is initiated.

The processing circuit 502 (e.g., the cell redirection & RNTI management module/circuit 508) executing the cell redirection & RNTI management operations 514 can initiate the cell update procedure from CELL_FACH or CELL_DCH by transmitting a cell update request message to the radio access network via the communications interface 504 on an uplink common control channel. In response to the cell update request message, the access terminal 500 may receive via the communications interface 504 a cell update confirmation message from the target cell on a downlink common control channel. The cell update confirmation message can include an updated H-RNTI that is valid for use by the access terminal 500 in the target cell. Accordingly, the processing circuit 502 may store the updated H-RNTI in the storage medium 506.

As operation 712 in FIG. 7, the processing circuit 502 (e.g., the cell redirection & RNTI management module/circuit 508) executing the cell redirection & RNTI management operations 514 can monitor the FACH after the H-RNTI is updated when the redirection information did not include a valid H-RNTI, or after it is determined that the redirection information did include a valid H-RNTI, as indicated.

By implementing one or more features described herein above, access terminals can obtain a valid H-RNTI in a timely manner for monitoring the FACH after a network-initiated redirection occurs without providing a valid H-RNTI in the redirection message. The forgoing features enable the cell update procedure, even though cell update procedures are not typically performed when the network initiates the redirection, since the network already is aware of the access terminal's location.

While the above discussed aspects, arrangements, and embodiments are discussed with specific details and particularity, one or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 4, and/or 5 may be configured to perform or employ one or more of the methods, features, parameters, and/or steps described in FIGS. 3, 4, 6, and/or 7. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
   a communications interface;
   a storage medium; and
   a processing circuit coupled to the communications interface and the storage medium, the processing circuit configured to:
   receive a redirection message via the communications interface, wherein the redirection message is configured to instruct the access terminal to redirect to a target cell;
   acquire the target cell in response to receiving the redirection message;
   determine that a current radio network temporary identity (RNTI) associated with the access terminal is invalid for use in the target cell, the determining comprising:
   determining that a high-speed forward access channel (HS-FACH) is employed for camping on the target cell in a CELL FACH state,
   determining that the redirection message did not include a high-speed downlink shared channel (HS-DSCH) RNTI (H-RNTI), and
   determining that a current RNTI stored in the storage medium is not an H-RNTI; and
   initiate a cell update procedure in the target cell in response to the determination that the current RNTI is invalid for use in the target cell.

2. The access terminal of claim 1, wherein the processing circuit adapted to determine that the current RNTI associated with the access terminal is invalid for use in the target cell comprises the access terminal adapted to:
   determine that a current RNTI stored in the storage medium is a high-speed downlink shared channel (HS-DSCH) RNTI (H-RNTI); and
   determine that a current H-RNTI is invalid for the target cell.

3. The access terminal of claim 1, wherein the redirection message comprises a radio resource control (RRC) reconfiguration message.

4. The access terminal of claim 1, wherein the processing circuit configured to acquire the target cell comprises the processing circuit further configured to:
   connect to the target cell; and
   camp on the target cell in a CELL_FACH state.

5. The access terminal of claim 1, wherein the processing circuit is further configured to:
   receive, via the communications interface, a high-speed downlink shared channel (HS-DSCH) RNTI (H-RNTI) that is valid for use in the target cell in response to initiating the cell update procedure in the target cell.

6. A method operational on an access terminal, the method comprising:
   receiving a redirection message from a serving cell in a wireless network;
   acquiring a target cell in the wireless network in response to receiving the redirection message;
   determining whether a current radio network temporary identity (RNTI) associated with the access terminal is valid for use in the target cell, the determining comprising:
   determining that the target cell employs a high-speed forward access channel (HS-FACH) utilizing a high-speed downlink shared channel (HS-DSCH) RNTI (H-RNTI) for each access terminal camping on the target cell in a CELL FACH state, and
   determining that the current RNTI associated with the access terminal is not an H-RNTI; and
   initiating a cell update procedure in the target cell when the current RNTI is determined to be invalid for use in the target cell.

7. The method of claim 6, wherein the determining whether the current RNTI associated with the access terminal is valid for use in the target cell comprises:
   determining that the current RNTI associated with the access terminal is a high-speed downlink shared channel (HS-DSCH) RNTI (H-RNTI) that was valid for use in the serving cell; and
   determining that a current H-RNTI is invalid for use in the target cell.

8. The method of claim 6, wherein the receiving the redirection message from the serving cell in the wireless network comprises:
   receiving a redirection message that does not include a high-speed downlink shared channel (HS-DSCH) RNTI (H-RNTI) to be employed by the access terminal in the target cell.

9. The method of claim 6, wherein the receiving the redirection message from the serving cell in the wireless network comprises:
   receiving a radio resource control (RRC) reconfiguration message from the serving cell in the wireless network.

10. The method of claim 6, wherein the acquiring the target cell in the wireless network in response to receiving the redirection message comprises camping on the target cell in a CELL_FACH state.

11. The method of claim 6, further comprising:
    receiving an updated RNTI in response to the initiating the cell update procedure in the target cell.

12. An access terminal, comprising:
    means for receiving a redirection message from a serving cell in a wireless network;
    means for acquiring a target cell in the wireless network in response to receiving the redirection message;
    means for determining whether a current radio network temporary identity (RNTI) associated with the access terminal is valid for use in the target cell, the means for determining configured to:
    determine that the target cell employs a high-speed forward access channel (HS-FACH) utilizing a high-speed downlink shared channel (HS-DSCH) RNTI (H-RNTI) for each access terminal camping on the target cell in a CELL FACH state, and
    determine that the current RNTI associated with the access terminal is not an H-RNTI; and
    means for initiating a cell update procedure in the target cell when the current RNTI is determined to be invalid for use in the target cell.

13. The access terminal of claim 12, wherein the means for determining whether the current RNTI associated with the access terminal is valid for use in the target cell is configured to:
    determine that the current RNTI associated with the access terminal is a high-speed downlink shared channel (HS-DSCH) RNTI (H-RNTI) that was valid for use in the serving cell; and
    determine that a current H-RNTI is invalid for use in the target cell.

14. The access terminal of claim 12, wherein the redirection message comprises a radio resource control (RRC) reconfiguration message that does not include a high-speed downlink shared channel (HS-DSCH) RNTI (H-RNTI) to be employed by the access terminal in the target cell.

15. The access terminal of claim 12, wherein the means for acquiring the target cell is configured to:
  connect to the target cell; and
  camp on the target cell in a CELL_FACH state.

16. A non-transitory processor-readable storage medium, comprising programming for causing a processing circuit to:
  acquire a target cell in response to a received redirection message;
  determine that a current radio network temporary identity (RNTI) is invalid for use in the target cell, the determining comprising:
    determining that the target cell employs a high-speed forward access channel (HS-FACH) utilizing a high-speed downlink shared channel (HS-DSCH) RNTI (H-RNTI) for camping on the target cell in a CELL_FACH state, and
    determining that the current RNTI is not an H-RNTI; and
  initiate a cell update procedure in the target cell in response to the determination that the current RNTI is invalid for use in the target cell.

17. The non-transitory processor-readable storage medium of claim 16, wherein the programming for causing the processing circuit to determine that the current RNTI is invalid for use in the target cell comprises programming for causing the processing circuit to:
  determine that the current RNTI is a high-speed downlink shared channel (HS-DSCH) RNTI (H-RNTI) that was valid in a previous serving cell; and
  determine that a current H-RNTI is invalid in the target cell.

18. The non-transitory processor-readable storage medium of claim 16, wherein the redirection message comprises a radio resource control (RRC) reconfiguration message that does not include a high-speed downlink shared channel (HS-DSCH) RNTI (H-RNTI) to be employed in the target cell.

19. The non-transitory processor-readable storage medium of claim 16, wherein the programming for causing the processing circuit to acquire the target cell comprises programming for causing the processing circuit to:
  connect to the target cell; and
  camp on the target cell in a CELL_FACH state.

* * * * *